(12) United States Patent
Goto et al.

(10) Patent No.: US 8,574,781 B2
(45) Date of Patent: *Nov. 5, 2013

(54) FUEL CELL STACK

(75) Inventors: Shuhei Goto, Utsunomiya (JP);
Narutoshi Sugita, Utsunomiya (JP);
Masaru Oda, Utsunomiya (JP);
Yasuhiro Watanabe, Kawaguichi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/999,949

(22) PCT Filed: Jun. 4, 2009

(86) PCT No.: PCT/JP2009/060224
§ 371 (c)(1),
(2), (4) Date: Dec. 17, 2010

(87) PCT Pub. No.: WO2009/154082
PCT Pub. Date: Dec. 23, 2009

(65) Prior Publication Data
US 2011/0097641 A1    Apr. 28, 2011

(30) Foreign Application Priority Data
Jun. 17, 2008    (JP) .................... 2008-157872

(51) Int. Cl.
*H01M 8/24*    (2006.01)
(52) U.S. Cl.
USPC ........................................ 429/457
(58) Field of Classification Search
USPC ........................................ 429/457
See application file for complete search history.

(56) References Cited

U.S. PATENT DOCUMENTS 6,663,994 B1 * 12/2003 Fly et al. .................. 429/465
7,195,837 B2    3/2007 Suzuki et al.
(Continued)

FOREIGN PATENT DOCUMENTS

| JP | 2003-338300 | 11/2003 |
| JP | 2004-87311 | 3/2004 |
| JP | 2007-141553 | 6/2007 |
| JP | 2007-207570 | 8/2007 |
| JP | 2007-213855 | 8/2007 |

OTHER PUBLICATIONS

International Search Report for Application No. PCT/JP2009/060224, dated Aug. 11, 2009.
(Continued)

*Primary Examiner* — Patrick Ryan
*Assistant Examiner* — Lucas J. O'Donnell
(74) *Attorney, Agent, or Firm* — Nelson Mullins Riley & Scarborough LLP; Anthony A. Laurentano; Neslihan I. Doran (57) ABSTRACT

A fuel cell stack. A fuel cell stack, an example of the fuel cell stack, is configured by alternately overlaying first electricity generating units and second electricity generating units in the horizontal direction. The first electricity units are each provided with a first fuel gas flow path, a first oxidant gas flow path, a second fuel gas flow path, and a second oxidant gas flow path, and the flow paths are set to the same phase in the overlaying direction. The second electricity generating units are each provided with a first fuel gas flow path, a first oxidant gas flow path, a second fuel gas flow path, and a second oxidant gas flow path which are set to the same phase in the overlaying direction and are set to a phase different from the phase of the flow paths of the first electricity generating units.

4 Claims, 11 Drawing Sheets

(56) References Cited

U.S. PATENT DOCUMENTS

| | | | |
|---|---|---|---|
| 2002/0061430 A1* | 5/2002 | Wakahoi et al. | 429/32 |
| 2003/0215695 A1* | 11/2003 | Suzuki et al. | 429/38 |
| 2004/0013922 A1* | 1/2004 | Tsuji | 429/24 |
| 2007/0207372 A1 | 9/2007 | Kikuchi et al. | |
| 2010/0055540 A1* | 3/2010 | Sugiura et al. | 429/34 |
| 2010/0310958 A1* | 12/2010 | Naito et al. | 429/434 |
| 2010/0316924 A1* | 12/2010 | Sugiura et al. | 429/434 |
| 2011/0159395 A1* | 6/2011 | Sugiura et al. | 429/457 |

OTHER PUBLICATIONS

Japanese Office Action for Application No. 2008-157872, 2 pages, dated Jan. 29, 2013.

Chinese Office Action for Application No. 200980121852.3, 9 pages, dated Oct. 23, 2012.

Supplementary European Search Report for Application No. 09766530.1, 3 pages, dated Apr. 16, 2013.

* cited by examiner

FUEL CELL STACK

RELATED APPLICATIONS

This application is a 35 U.S.C. 371 national stage filing of International Application No. PCT/JP2009/060224, filed Jun. 4, 2009, which claims priority to Japanese Patent Application No. 2008-157872 filed on Jun. 17, 2008 in Japan. The contents of the aforementioned applications are hereby incorporated by reference.

TECHNICAL FIELD

The present invention relates to a fuel cell stack including power generation units each formed by sandwiching an electrolyte electrode assembly between metal separators. The electrolyte electrode assembly includes an anode, a cathode, and an electrolyte interposed between the anode and the cathode. Each of the power generation units has a corrugated fuel gas flow field for supplying a fuel gas to the anode and a corrugated oxygen-containing gas flow field for supplying an oxygen-containing gas to the cathode. The power generation units include a first power generation unit and a second power generation unit stacked alternately such that a coolant flow field is formed between the first power generation unit and the second power generation unit.

BACKGROUND ART

For example, a solid polymer electrolyte fuel cell employs a solid polymer electrolyte membrane. The solid polymer electrolyte membrane is a polymer ion exchange membrane, and interposed between an anode and a cathode to form a membrane electrode assembly (MEA). The membrane electrode assembly is sandwiched between separators to form a unit cell. In use, normally, a predetermined number of the unit cells are stacked together to form a fuel cell stack.

In the fuel cell, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, a coolant flow field is formed between the separators for supplying a coolant along surfaces of the separators as necessary.

In the case where metal separators of thin corrugated plates are used as the separators, by providing grooves as the fuel gas flow field on one surface of the metal separator facing the anode, ridges as the back side of the grooves are formed on the other surface of the metal separator. Further, by forming grooves as the oxygen-containing gas flow field on one surface of the metal separator facing the cathode, ridges as the back side of the grooves are formed on the other surface of the metal separator.

In the structure, by providing corrugated grooves in a serpentine pattern to form the fuel gas flow field and the oxygen-containing gas flow field, the back surfaces of the grooves are stacked together between unit cells to form a coolant flow field where a coolant flows in a direction different from the flow directions of the fuel gas and the oxygen-containing gas.

Figure 11:
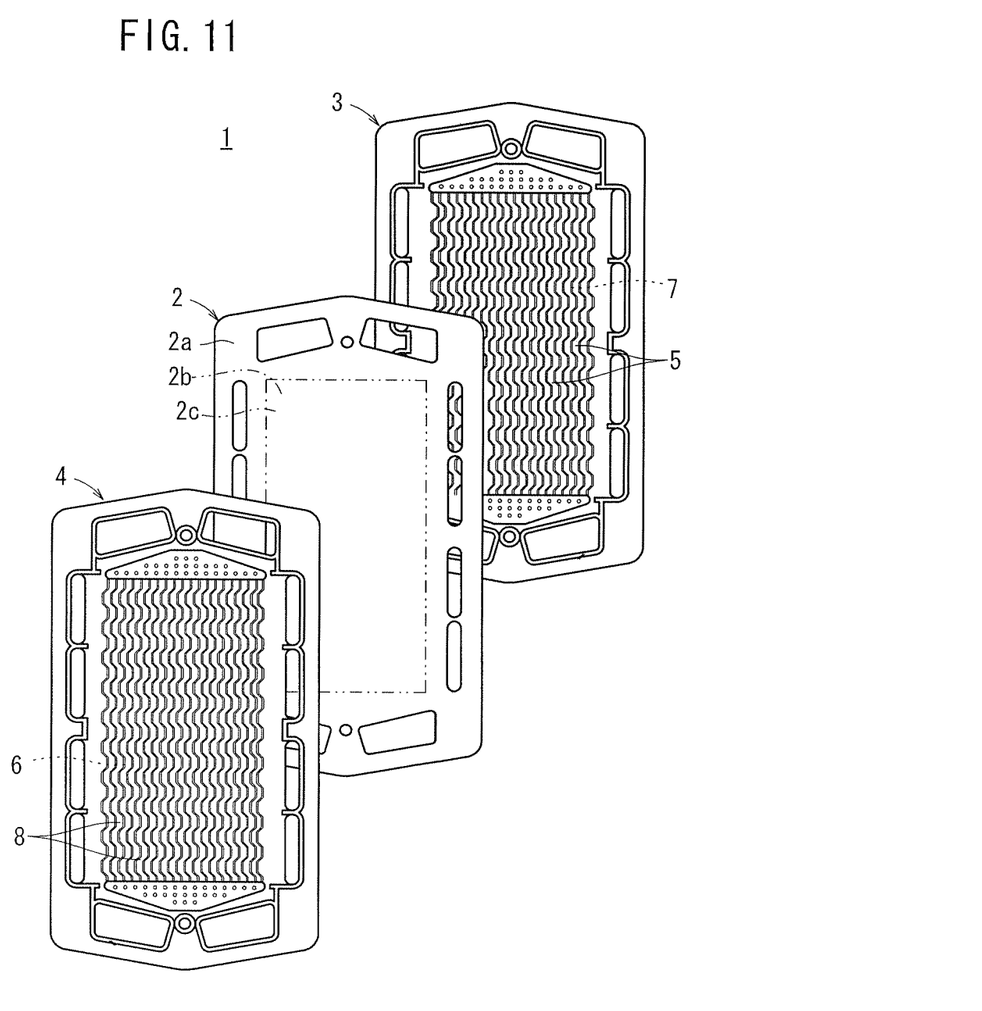
FIG. 11 is a view showing a fuel cell stack disclosed in Japanese Laid-Open Patent Publication No. 2007-141553.

For example, according to the disclosure of Japanese Laid-Open Patent Publication No. 2007-141553, as shown in FIG. 11, a plurality of unit cells 1 are stacked together to form the fuel cell stack. Each of the unit cells 1 includes metal separators 3, 4 on both sides of a membrane electrode assembly 2.

The membrane electrode assembly 2 includes an anode 2b, a cathode 2c, and a solid polymer electrolyte membrane 2a interposed between the anode 2b and the cathode 2c. A plurality of fuel gas flow grooves 5 extending vertically in a serpentine pattern are formed on a surface of a metal separator 3 facing the anode 2b. A plurality of oxygen-containing gas flow grooves 6 extending vertically in a serpentine pattern are formed on a surface of a metal separator 4 facing the cathode 2c.

Grooves 7 are formed on the back of the fuel gas flow grooves 5 of the metal separator 3. Grooves 8 are formed on the back of the oxygen-containing gas flow grooves 6 of the metal separator 4. Therefore, when the unit cells 1 are stacked together, the grooves 7, 8 are overlapped together to form a coolant flow field extending in a horizontal direction between the unit cells 1.

SUMMARY OF INVENTION

In the above fuel cell stack, in order to form the coolant flow field extending in the horizontal direction in each space between the unit cells 1, it is required to form the grooves 7, 8 in different phases, and mutually overlap the grooves 7, 8. Therefore, in the state where the membrane electrode assembly 2 is sandwiched between the metal separators 3, 4, the fuel gas flow grooves 5 and the oxygen-containing gas flow grooves 6 are arranged in serpentine patterns in different phases.

In the structure, when the membrane electrode assembly 2 is sandwiched between the ridges forming the fuel gas flow grooves 5 in the serpentine pattern and the ridges forming the oxygen-containing gas flow grooves 6 in the serpentine pattern, the serpentine ridges are deviated from each other (in different phases) in the stacking direction. Therefore, a shearing force may be applied to the membrane electrode assembly 2 undesirably.

The present invention has been made to solve the problems of this type, and an object of the present invention is to provide a fuel cell stack having simple and economical structure in which it is possible to reliably prevent a shearing force from being applied to an electrolyte electrode assembly from metal separators.

A fuel cell stack includes power generation units each formed by sandwiching an electrolyte electrode assembly between metal separators. The electrolyte electrode assembly includes an anode, a cathode, and an electrolyte interposed between the anode and the cathode. Each of the power generation units has a corrugated fuel gas flow field for supplying a fuel gas to the anode and a corrugated oxygen-containing gas flow field for supplying an oxygen-containing gas to the cathode. The power generation units includes a first power generation unit and a second power generation unit stacked alternately such that a coolant flow field is formed between the first power generation unit and the second power generation unit.

The fuel gas flow field and the oxygen-containing gas flow field of the first power generation unit are in the same phase with each other. The fuel gas flow field and the oxygen-containing gas flow field of the second power generation unit are in the same phase with each other. The fuel gas flow field and the oxygen-containing gas flow field of the first power generation unit and the fuel gas flow field and the oxygen-containing gas flow field of the second power generation unit are in different phases from each other, respectively.

Further, preferably, the first and second power generation units include at least first and second electrolyte electrode assemblies. The first electrolyte electrode assembly is stacked on a first metal separator, a second metal separator is stacked on the first electrolyte electrode assembly, the second electrolyte electrode assembly is stacked on the second metal separator, and a third metal separator is stacked on the second electrolyte electrode assembly.

Further, preferably, the first and second power generation units are formed by stacking the electrolyte electrode assemblies and the metal separators alternately such that the metal separators are provided at both ends of the fuel cell stack in the stacking direction.

According to the present invention, in each of the first power generation unit and the second power generation unit, the fuel gas flow field and the oxygen-containing gas flow field are in the same phase with each other. In the structure, no shearing force is applied to the membrane electrode assemblies, and damages of the membrane electrode assemblies can be prevented advantageously. Further, simply by stacking the first power generation unit and the second power generation unit alternately, the fuel cell stack having simple and economical structure can be produced.

DESCRIPTION OF EMBODIMENTS

Figure 1:
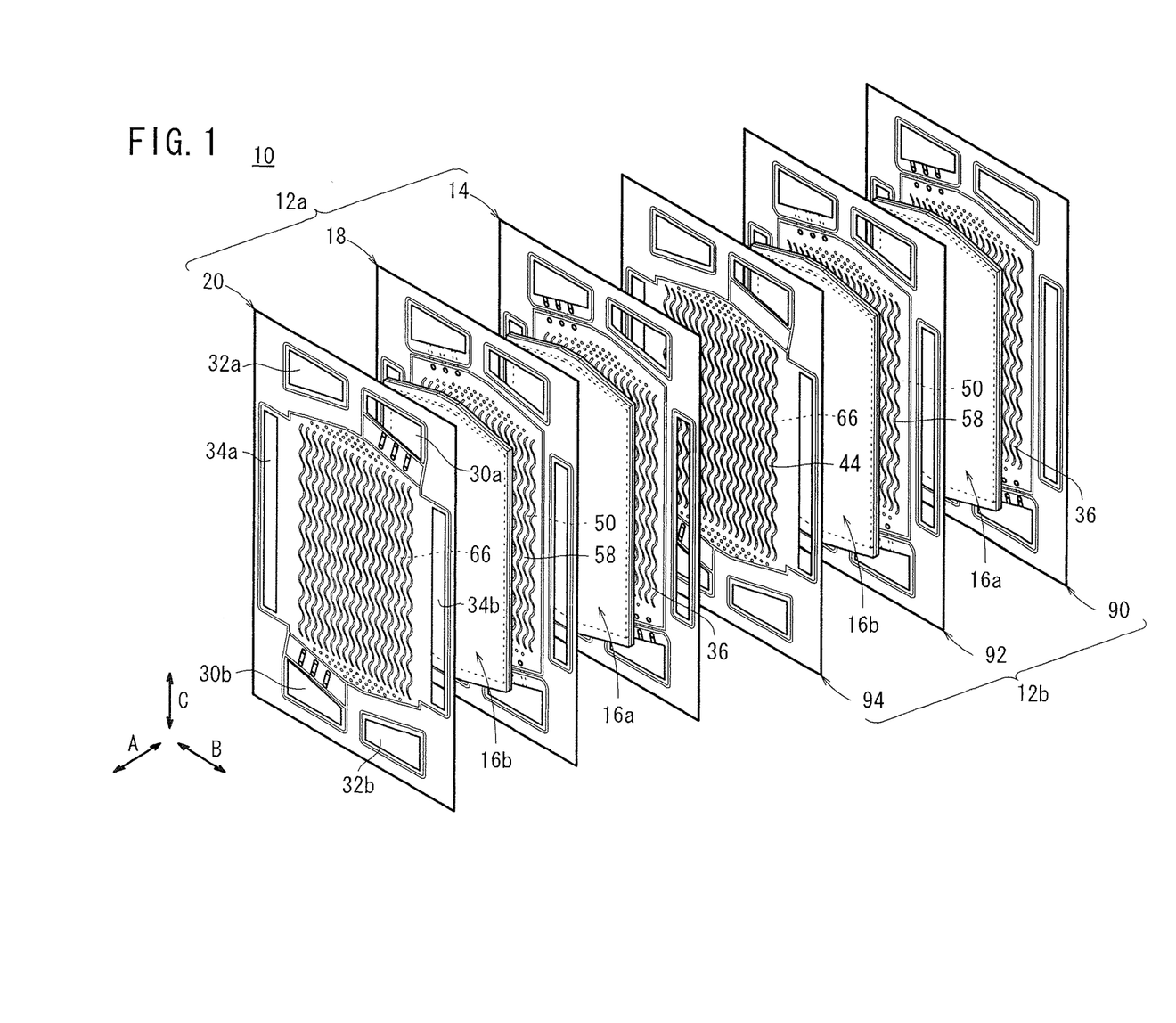
FIG. 1 is an exploded perspective view showing main components of a fuel cell stack according to a first embodiment of the present invention.

FIG. 1 is an exploded perspective view showing main components of a fuel cell stack 10 according to a first embodiment of the present invention.

Figure 2:
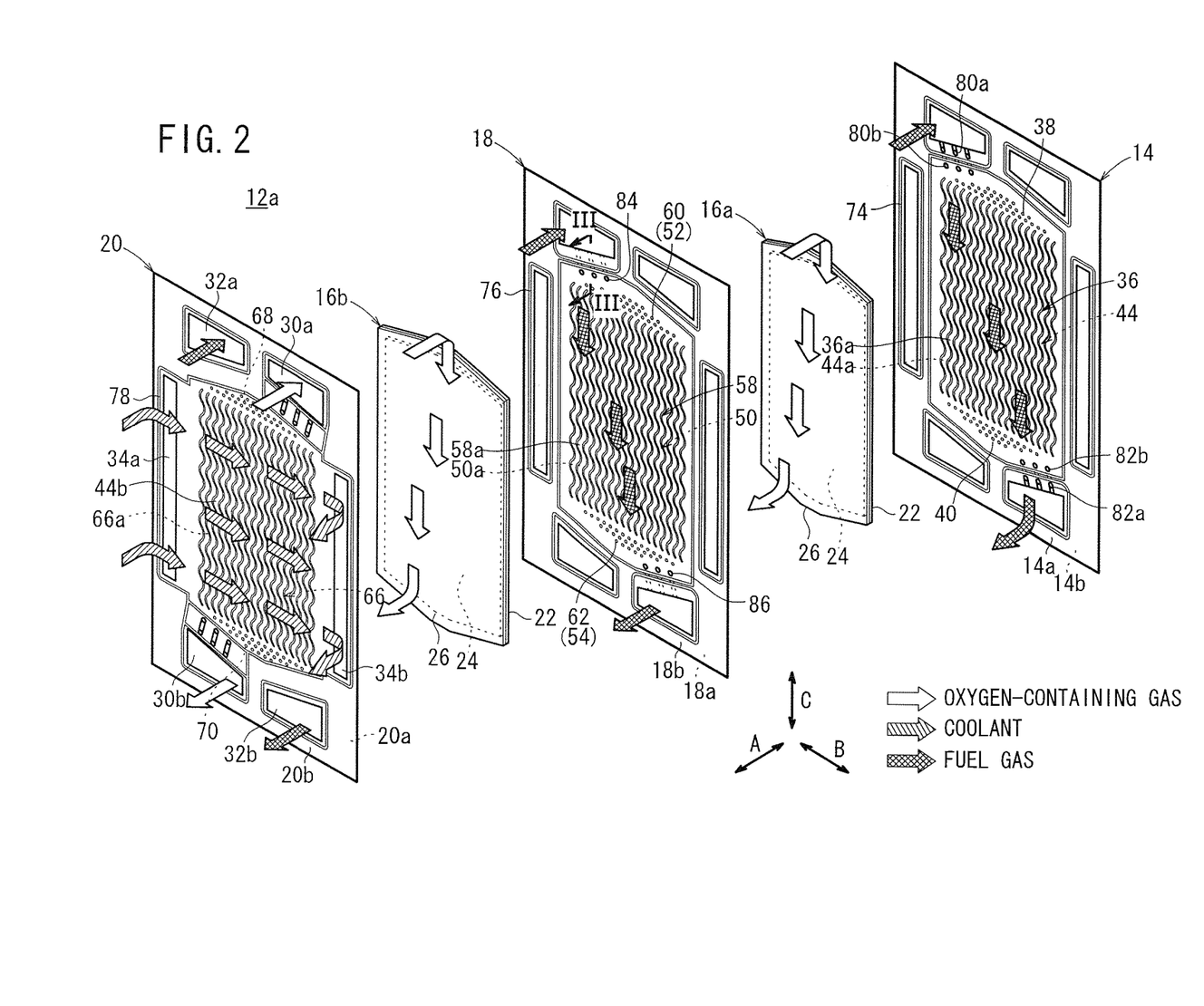
FIG. 2 is an exploded perspective view showing main components of a first power generation unit of the fuel cell stack.
Figure 3:
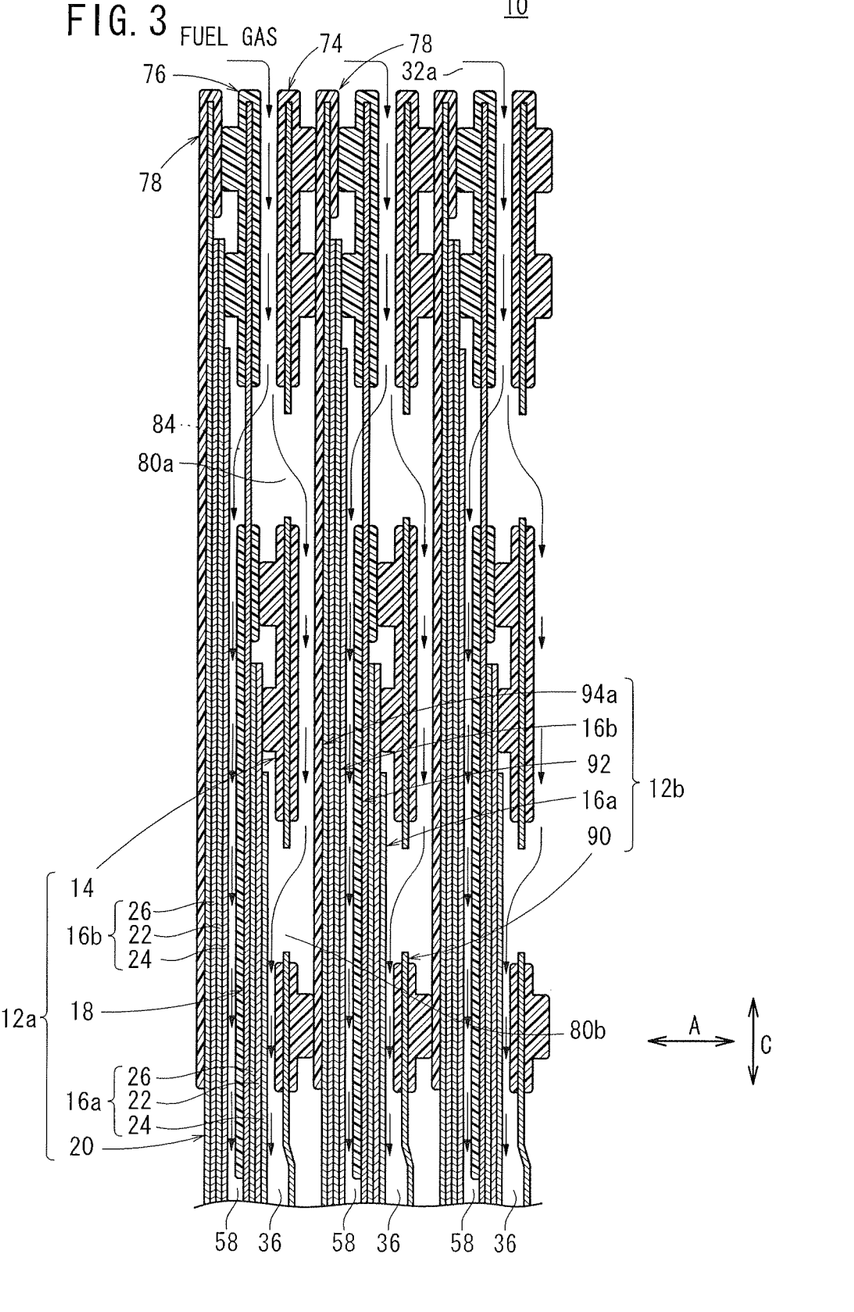
FIG. 3 is a cross sectional view showing the fuel cell stack, taken along a line III-III in FIG. 2.

The fuel cell stack 10 is formed by stacking a first power generation unit 12a and a second power generation unit 12b alternately in a horizontal direction indicated by an arrow A. As shown in FIGS. 2 and 3, the first power generation unit 12a includes a first metal separator 14, a first membrane electrode assembly (electrolyte electrode assembly) 16a, a second metal separator 18, a second membrane electrode assembly 16b, and a third metal separator 20. The first power generation unit 12a may include three or more MEAs.

For example, the first metal separator 14, the second metal separator 18, and the third metal separator 20 are steel plates, stainless steel plates, aluminum plates, plated steel sheets, or metal plates having anti-corrosive surfaces by surface treatment. Each of the first metal separator 14, the second metal separator 18, and the third metal separator 20 has a concave-convex shape in cross section, by corrugating a metal thin plate under pressure.

The surface area of the first membrane electrode assembly 16a is smaller than the surface area of the second membrane electrode assembly 16b. Each of the first and second membrane electrode assemblies 16a, 16b includes an anode 24, a cathode 26 and a solid polymer electrolyte membrane 22 interposed between the anode 24 and the cathode 26. The solid polymer electrolyte membrane 22 is formed by impregnating a thin membrane of perfluorosulfonic acid with water, for example. The surface area of the anode 24 is smaller than the surface area of the cathode 26.

Each of the anode 24 and the cathode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layers are formed on both surfaces of the solid polymer electrolyte membrane 22, respectively.

As shown in FIG. 2, at an upper end of the first power generation unit 12a in the longitudinal direction indicated by an arrow C, an oxygen-containing gas supply passage 30a for supplying an oxygen-containing gas and a fuel gas supply passage 32a for supplying a fuel gas such as a hydrogen-containing gas are provided. The oxygen-containing gas supply passage 30a and the fuel gas supply passage 32a extend through the first power generation unit 12a in the direction indicated by the arrow A.

At a lower end of the first power generation unit 12a in the longitudinal direction indicated by the arrow C, a fuel gas discharge passage 32b for discharging the fuel gas and an oxygen-containing gas discharge passage 30b for discharging the oxygen-containing gas are provided. The fuel gas discharge passage 32b and the oxygen-containing gas discharge passage 30b extend through the first power generation unit 12a in the direction indicated by the arrow A.

At one end of the first power generation unit 12a in a lateral direction indicated by an arrow B, a coolant supply passage 34a for supplying a coolant is provided, and at the other end of the first power generation unit 12a in the lateral direction indicated by the arrow B, a coolant discharge passage 34b for discharging the coolant is provided. The coolant supply passage 34a and the coolant discharge passage 34b extend through the first power generation unit 12a in the direction indicated by the arrow A.

The first metal separator 14 has a first fuel gas flow field 36 on its surface 14a facing the first membrane electrode assembly 16a. The first fuel gas flow field 36 is connected between the fuel gas supply passage 32a and the fuel gas discharge passage 32b. The first fuel gas flow field 36 includes a plurality of corrugated flow grooves (recesses) 36a extending in the direction indicated by the arrow C. An inlet buffer 38 and an outlet buffer 40 are provided at positions near an inlet and an outlet of the first fuel gas flow field 36, and a plurality of bosses are provided in the inlet buffer 38 and the outlet buffer 40.

A coolant flow field 44 is partially formed on a surface 14b of the first metal separator 14. The coolant flow field 44 is connected between the coolant supply passage 34a and the coolant discharge passage 34b. A plurality of corrugated flow grooves (recesses) 44a are formed on the back of the corrugated flow grooves 36a of the first fuel gas flow field 36 on the surface 14b.

The second metal separator 18 has a first oxygen-containing gas flow field 50 on its surface 18a facing the first membrane electrode assembly 16a. The first oxygen-containing gas flow field 50 is connected between the oxygen-containing gas supply passage 30a and the oxygen-containing gas discharge passage 30b. The first oxygen-containing gas flow field 50 includes a plurality of corrugated flow grooves (recesses) 50a extending in the direction indicated by the arrow C. An inlet buffer 52 and an outlet buffer 54 are provided at positions near an inlet and an outlet of the first oxygen-containing gas flow field 50.

The second metal separator 18 has a second fuel gas flow field 58 on its surface 18b facing the second membrane electrode assembly 16b. The second fuel gas flow field 58 is connected between the fuel gas supply passage 32a and the fuel gas discharge passage 32b. The second fuel gas flow field 58 includes a plurality of corrugated flow grooves (recesses) 58a extending in the direction indicated by the arrow C. An inlet buffer 60 and an outlet buffer 62 are provided at positions near an inlet and an outlet of the second fuel gas flow field 58. The second fuel gas flow field 58 is formed on the back of the first oxygen-containing gas flow field 50, and the inlet buffer 60 and the outlet buffer 62 are formed on the back of the inlet buffer 52 and the outlet buffer 54.

The third metal separator 20 has a second oxygen-containing gas flow field 66 on its surface 20a facing the second membrane electrode assembly 16b. The second oxygen-containing gas flow field 66 is connected between the oxygen-containing gas supply passage 30a and the oxygen-containing gas discharge passage 30b. The second oxygen-containing gas flow field 66 includes a plurality of corrugated flow grooves (recesses) 66a extending in the direction indicated by the arrow C. An inlet buffer 68 and an outlet buffer 70 are provided at positions near an inlet and an outlet of the second oxygen-containing gas flow field 66.

The coolant flow field 44 is partially formed on the surface 20b of the third metal separator 20. A plurality of corrugated flow grooves (recesses) 44b are formed on the back of the corrugated flow grooves 66a of the second oxygen-containing gas flow field 66.

In the first power generation unit 12a, corrugations of the first fuel gas flow field 36, the first oxygen-containing gas flow field 50, the second fuel gas flow field 58, and the second oxygen-containing gas flow field 66 are in the same phase with each other along the stacking direction. Further, the corrugations have the same pitch and the amplitude.

Figure 4:
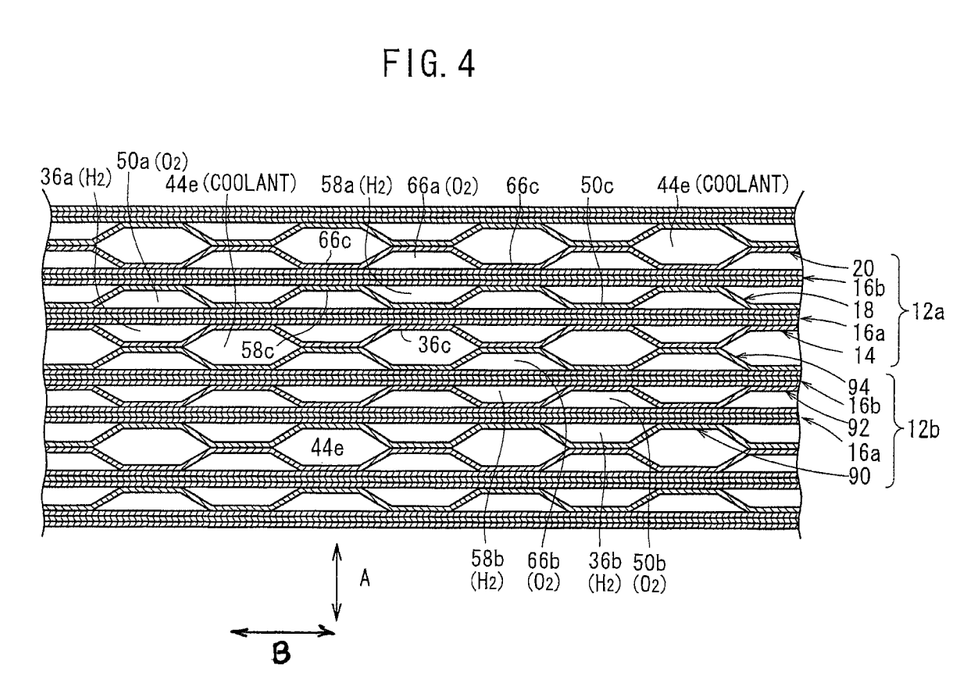
FIG. 4 is a partial cross sectional view showing the fuel cell stack.

As shown in FIG. 4, when the first membrane electrode assembly 16a is sandwiched between the first metal separator 14 and the second metal separator 18, ridges 36c forming the corrugated flow grooves 36a of the first fuel gas flow field 36 and ridges 50c forming the corrugated flow grooves 50a of the first oxygen-containing gas flow field 50 are arranged at the same positions in the stacking direction.

When the second membrane electrode assembly 16b is sandwiched between the second metal separator 18 and the third metal separator 20, ridges 58c forming the corrugated flow grooves 58a of the second fuel gas flow field 58 and ridges 66c forming the corrugated flow grooves 66a of the second oxygen-containing gas flow field 66 are arranged at the same positions in the stacking direction.

As shown in FIGS. 2 and 3, a first seal member 74 is formed integrally on the surfaces 14a, 14b of the first metal separator 14, around the outer end of the first metal separator 14. Further, the second seal member 76 is formed integrally on the surfaces 18a, 18b of the second metal separator 18, around the outer end of the second metal separator 18. A third seal member 78 is formed integrally on the surfaces 20a, 20b of the third metal separator 20, around the outer end of the third metal separator 20.

The first metal separator 14 has a plurality of outer supply holes 80a and inner supply holes 80b connecting the fuel gas supply passage 32a to the first fuel gas flow field 36, and a plurality of outer discharge holes 82a and inner discharge holes 82b connecting the fuel gas discharge passage 32b to the first fuel gas flow field 36.

The second metal separator 18 has a plurality of supply holes 84 connecting the fuel gas supply passage 32a and the second fuel gas flow field 58, and a plurality of discharge holes 86 connecting the fuel gas discharge passage 32b and the second fuel gas flow field 58.

As shown in FIG. 1, the second power generation unit 12b includes a first metal separator 90, a first membrane electrode assembly 16a, a second metal separator 92, a second membrane electrode assembly 16b, and a third metal separator 94. The constituent elements of the second power generation unit 12b that are identical to those of the first power generation unit 12a are labeled with the same reference numerals, and such detailed description will be omitted.

Figure 5:
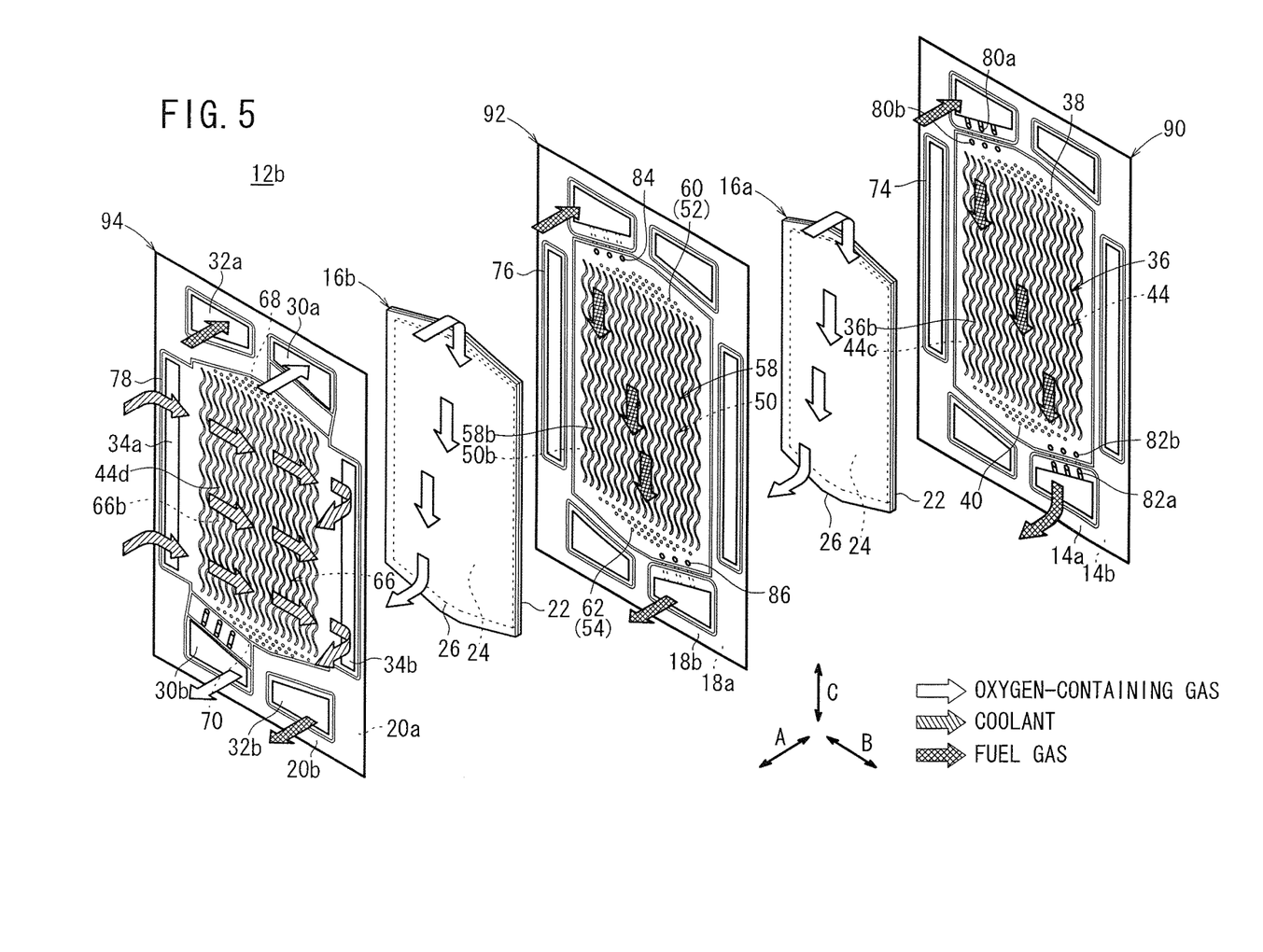
FIG. 5 is an exploded perspective view showing main components of a second power generation unit of the fuel cell stack.

As shown in FIG. 5, a first fuel gas flow field 36 including a plurality of corrugated flow grooves 36b is formed on the surface 14a of the first metal separator 90, and corrugated flow grooves 44c are formed on the surface 14b of the first metal separator 90.

A first oxygen-containing gas flow field 50 including a plurality of corrugated flow grooves 50b is formed on the surface 18a of the second metal separator 92, and a second fuel gas flow field 58 including a plurality of corrugated flow grooves 58b is formed on the surface 18b of the second metal separator 92.

A second oxygen-containing gas flow field 66 including a plurality of corrugated flow grooves 66b is formed on the surface 20a of the third metal separator 94, and a plurality of corrugated flow grooves 44d are formed on the surface 20b.

In the second power generation unit 12b, the first fuel gas flow field 36, the first oxygen-containing gas flow field 50, the second fuel gas flow field 58, and the second oxygen-containing gas flow field 66 are in the same phase with each other in the stacking direction. The first fuel gas flow field 36, the first oxygen-containing gas flow field 50, the second fuel gas flow field 58, and the second oxygen-containing gas flow field 66 of the first power generation unit 12a and the first fuel gas flow field 36, the first oxygen-containing gas flow field 50, the second fuel gas flow field 58, and the second oxygen-containing gas flow field 66 of the second power generation unit 12b are in different phases from each other (in opposite phases to each other). Further, the corrugations have the same pitch and the same amplitude (see FIG. 1).

The first power generation unit 12a and the second power generation unit 12b are stacked together. Thus, the coolant flow field 44 extending in the direction indicated by the arrow B is formed between the first metal separator 14 of the first power generation unit 12a and the third metal separator 94 of the second power generation unit 12b.

Figure 6:
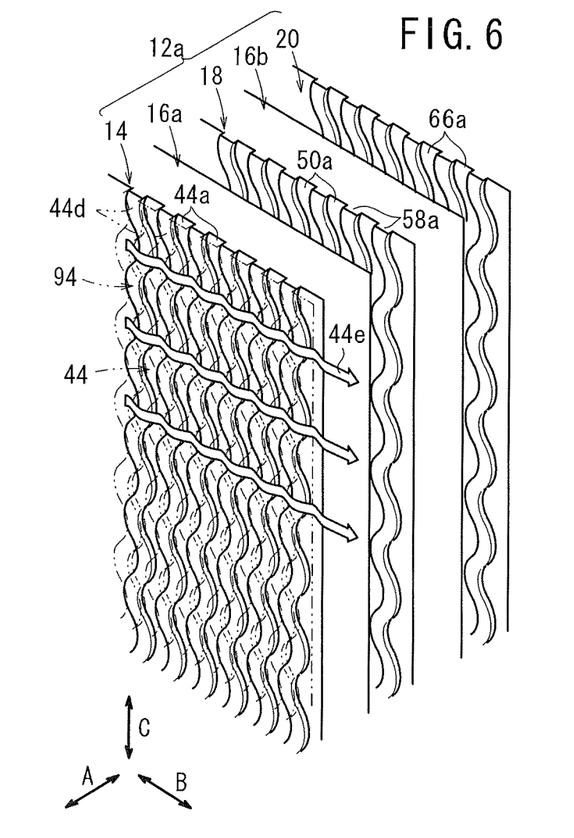
FIG. 6 is a perspective view showing a coolant flow field formed between the first power generation unit and the second power generation unit.

In the coolant flow field 44, the corrugated flow grooves 44a and the corrugated flow grooves 44d are in different phases. In the structure, by mutually overlapping the corrugated flow grooves 44a and the corrugated flow grooves 44d, a plurality of grooves 44e extending in a horizontal direction indicated by the arrow B are formed between the corrugated flow grooves 44a and the corrugated flow grooves 44d (see FIGS. 4 and 6).

Operation of the fuel cell stack 10 having the structure will be described below.

Firstly, as shown in FIG. 1, an oxygen-containing gas is supplied to the oxygen-containing gas supply passage 30a, and a fuel gas such as a hydrogen-containing gas is supplied to the fuel gas supply passage 32a. Further, a coolant such as pure water, ethylene glycol, or oil is supplied to the coolant supply passage 34a.

Thus, in the first power generation unit 12a, as shown in FIG. 2, the oxygen-containing gas from the oxygen-containing gas supply passage 30a flows into the first oxygen-containing gas flow field 50 of the second metal separator 18 and the second oxygen-containing gas flow field 66 of the third metal separator 20. The oxygen-containing gas moves along the first oxygen-containing gas flow field 50 in the direction of gravity indicated by the arrow C, and the oxygen-containing gas is supplied to the cathode 26 of the first membrane electrode assembly 16a. Further, the oxygen-containing gas moves along the second oxygen-containing gas flow field 66 in the direction indicated by the arrow C, and the oxygen-containing gas is supplied to the cathode 26 of the second membrane electrode assembly 16b.

As shown in FIG. 3, the fuel gas from the fuel gas supply passage 32a flows through the outer supply holes 80a toward the surface 14b of the first metal separator 14. Further, the fuel gas flows from the inner supply holes 80b toward the surface 14a, and then, the fuel gas is supplied to the inlet buffer 38. The fuel gas moves along the first fuel gas flow field 36 in the direction of gravity indicated by the arrow C, and the fuel gas is supplied to the anode 24 of the first membrane electrode assembly 16a (see FIG. 2).

Further, as shown in FIG. 3, the fuel gas flows through the supply holes 84 toward the surface 18b of the second metal separator 18. Thus, as shown in FIG. 2, after the fuel gas is supplied to the inlet buffer 60 on the surface 18b, the fuel gas moves along the second fuel gas flow field 58 in the direction indicated by the arrow C, and the fuel gas is supplied to the anode 24 of the second membrane electrode assembly 16b.

Thus, in each of the first and second membrane electrode assemblies 16a, 16b, the oxygen-containing gas supplied to the cathode 26 and the fuel gas supplied to the anode 24 are partially consumed in the electrochemical reactions at electrode catalyst layers of the cathode 26 and the anode 24 for generating electricity.

The oxygen-containing gas supplied to and partially consumed at the cathodes 26 of the first and second membrane electrode assemblies 16a, 16b is discharged to the oxygen-containing gas discharge passage 30b, and flows in the direction indicated by the arrow A.

The fuel gas supplied to and partially consumed at the anode 24 of the first membrane electrode assembly 16a flows from the outlet buffer 40 to the inner discharge holes 82b toward the surface 14b of the first metal separator 14. The fuel gas discharged to the surface 14b flows through the outer discharge holes 82a, and moves toward the surface 14a again. Then, the fuel gas is discharged into the fuel gas discharge passage 32b.

Further, the fuel gas supplied to and partially consumed at the anode 24 of the second membrane electrode assembly 16b flows from the outlet buffer 62 through the discharge holes 86 toward the surface 18a. The fuel gas is discharged into the fuel gas discharge passage 32b.

As shown in FIGS. 4 and 5, the coolant supplied to the coolant supply passage 34a flows into the coolant flow field 44 formed between the first metal separator 14 of the first power generation unit 12a and the third metal separator 94 of the second power generation unit 12b. Then, the coolant flows in the direction indicated by the arrow B. After the coolant cools the first and second membrane electrode assemblies 16a, 16b, the coolant is discharged to the coolant discharge passage 34b.

Further, in the second power generation unit 12b, in the same manner as in the case of the first power generation unit 12a, power generation is performed by the first and second membrane electrode assemblies 16a, 16b.

In the first embodiment, in the first power generation unit 12a, as shown in FIG. 2, the first fuel gas flow field 36, the first oxygen-containing gas flow field 50, the second fuel gas flow field 58, and the second oxygen-containing gas flow field 66 are in the same phase with each in the stacking direction. Therefore, as shown in FIG. 4, the first membrane electrode assembly 16a is sandwiched between the ridges 36c forming the first fuel gas flow field 36 and the ridges 50c forming the first oxygen-containing gas flow field 50 at the same positions in the stacking direction.

Likewise, the second membrane electrode assembly 16b is sandwiched between the ridges 58c forming the second fuel gas flow field 58 and the ridges 66c forming the second oxygen-containing gas flow field 66 at the same positions in the stacking direction. In the structure, when the first and second membrane electrode assemblies 16a, 16b are fastened and retained together in the stacking direction, no shearing force is applied to the first and second membrane electrode assemblies 16a, 16b, and damages of the first and second membrane electrode assemblies 16a, 16b can be prevented advantageously.

Further, the first fuel gas flow field 36, the first oxygen-containing gas flow field 50, the second fuel gas flow field 58, and the second oxygen-containing gas flow field 66 of the first power generation unit 12a and the first fuel gas flow field 36, the first oxygen-containing gas flow field 50, the second fuel gas flow field 58, and the second oxygen-containing gas flow field 66 of the second power generation unit 12b are in different phases from each other. In the structure, simply by stacking the first power generation unit 12a and the second power generation unit 12b alternately, the coolant flow field 44 having the grooves 44e extending in the direction indicated by the arrow B is formed between the first and second power generation units 12a, 12b.

Thus, simply by alternately stacking the first power generation unit 12a and the second power generation unit 12b, the fuel cell stack 10 having simple and economical structure is produced advantageously.

Figure 7:
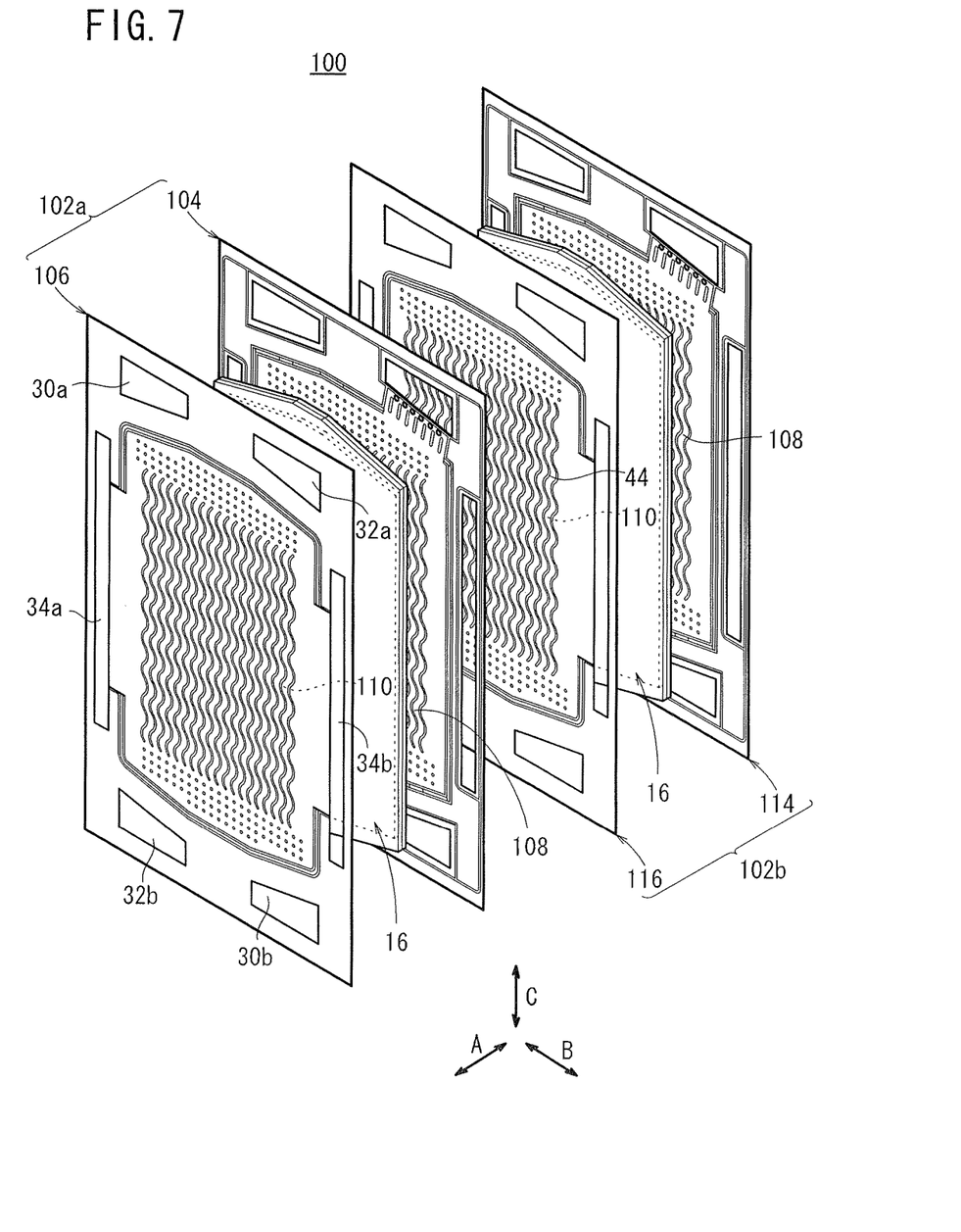
FIG. 7 is an exploded perspective view showing main components of a fuel cell stack according to a second embodiment of the present invention.

FIG. 7 is an exploded perspective view showing main components of a fuel cell stack 100 according to a second embodiment of the present invention. The constituent elements of the fuel cell stack 100 that are identical to those of the fuel cell stack 10 according to the first embodiment are labeled with the same reference numerals, and such detailed description will be omitted.

Figure 8:
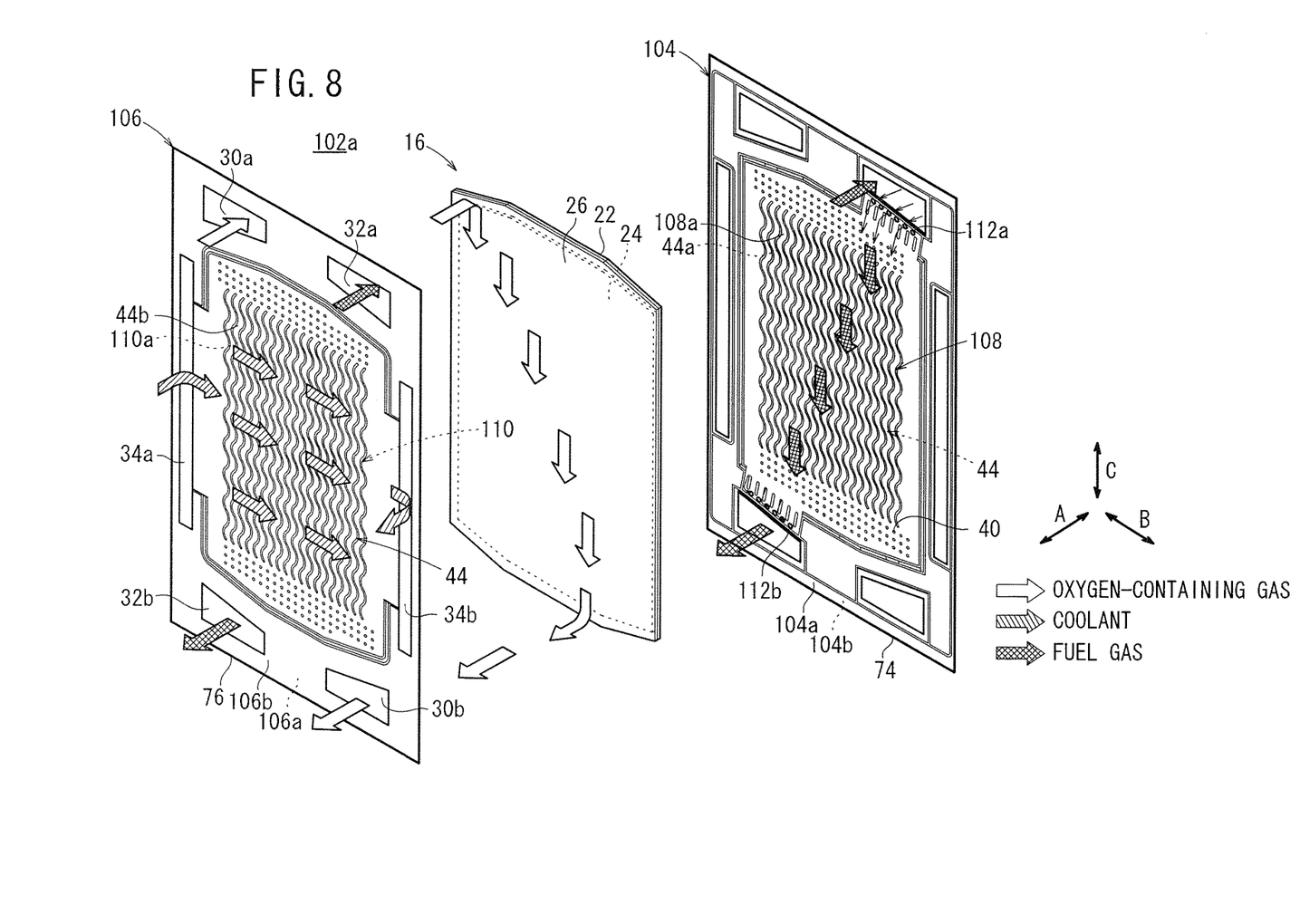
FIG. 8 is an exploded perspective view showing main components of a first power generation unit of the fuel cell stack.
Figure 9:
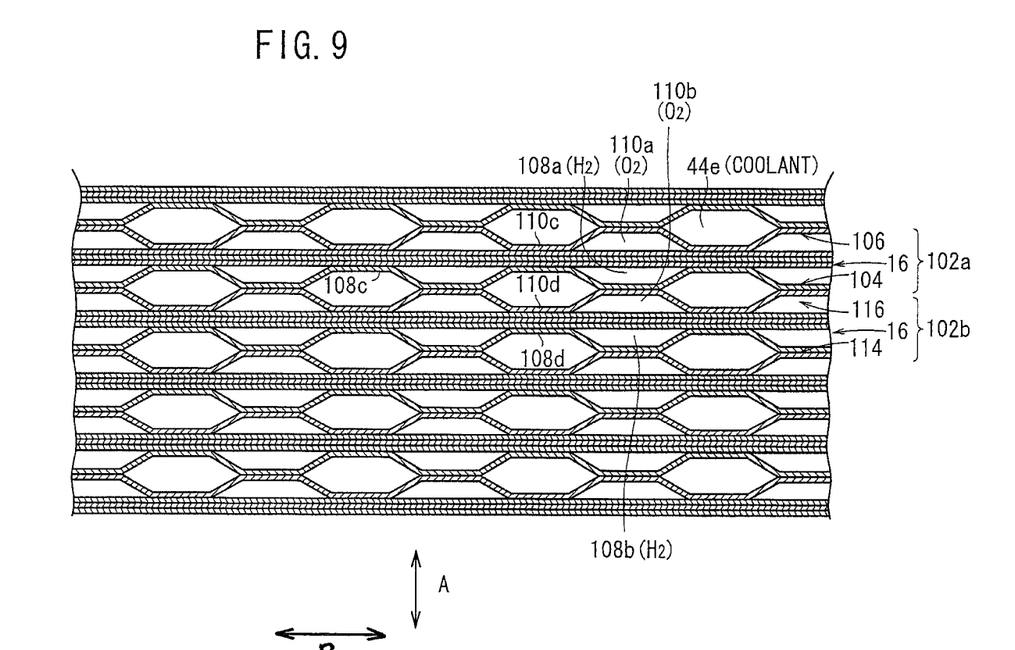
FIG. 9 is a partial cross sectional view showing the fuel cell stack.

The fuel cell stack 100 is formed by stacking a first power generation unit 102a and a second power generation unit 102b alternatively in a horizontal direction. As shown in FIGS. 8 and 9, a first metal separator 104, a membrane electrode assembly 16, and a second metal separator 106 are provided in the first power generation unit 102a.

The first metal separator 104 has a fuel gas flow field 108 on its surface 104a facing the membrane electrode assembly 16. The fuel gas flow field 108 includes a plurality of corrugated flow grooves 108a extending in the direction indicated by the arrow C. A plurality of corrugated flow grooves 44a forming a coolant flow field 44 are formed on a surface 104b of the first metal separator 104.

The second metal separator 106 has an oxygen-containing gas flow field 110 on its surface 106a facing the membrane electrode assembly 16. The oxygen-containing gas flow field 110 includes a plurality of corrugated flow grooves 110a extending in the direction indicated by the arrow C. A plurality of corrugated flow grooves 44b forming part of the coolant flow field 44 are formed on a surface 106b of the second metal separator 106. The fuel gas flow field 108 and the oxygen-containing gas flow field 110 are in the same phase with each other in the stacking direction.

The first metal separator 104 has supply holes 112a connecting the fuel gas supply passage 32a and the fuel gas flow field 108, and discharge holes 112b connecting the fuel gas discharge passage 32b and the fuel gas flow field 108.

Figure 10:
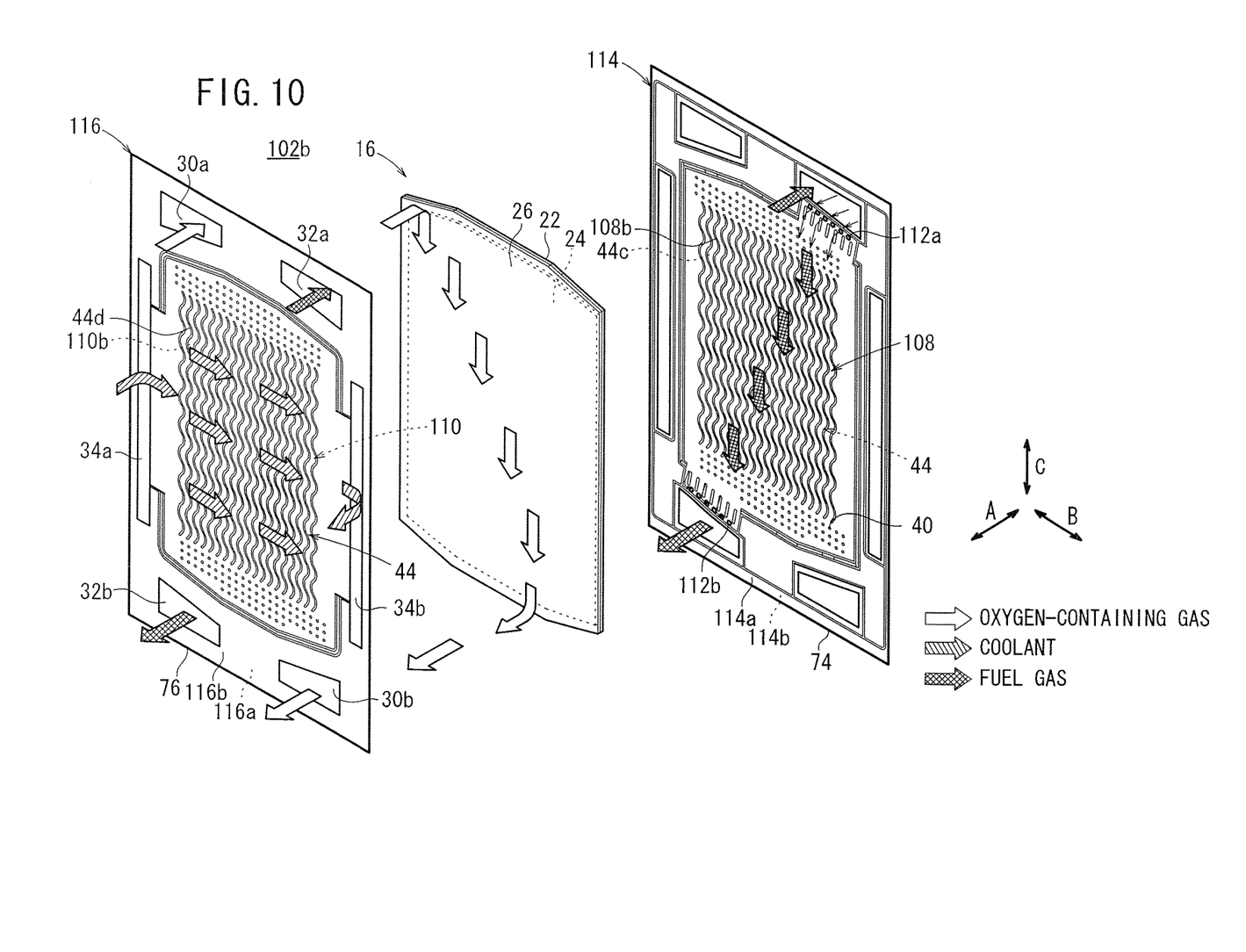
FIG. 10 is an exploded perspective view showing main components of a second power generation unit of the fuel cell stack.

As shown in FIGS. 7 and 10, the second power generation unit 102b includes a first metal separator 114, a membrane electrode assembly 16, and a second metal separator 116. The first metal separator 114 has a fuel gas flow field 108 on its surface 114a facing the membrane electrode assembly 16. The fuel gas flow field 108 includes a plurality of corrugated flow grooves 108b extending in the direction indicated by the arrow C.

A plurality of corrugated flow grooves 44c forming a coolant flow field 44 are formed on a surface 114b of the first metal separator 114. The second metal separator 116 has an oxygen-containing gas flow field 110 on its surface 116a facing the membrane electrode assembly 16. The oxygen-containing gas flow field 110 includes corrugated flow grooves 110b extending in the direction indicated by the arrow C. A plurality of corrugated flow grooves 44d forming the coolant flow field 44 are formed on a surface 116b of the second metal separator 116.

In the second power generation unit 102b, the fuel gas flow field 108 and the oxygen-containing gas flow field 110 are in the same phase with each other in the stacking direction. The fuel gas flow field 108 and the oxygen-containing gas flow field 110 of the second power generation unit 102b and the fuel gas flow field 108 and the oxygen-containing gas flow field 110 of the first power generation unit 102a are in different phases.

The first power generation unit 102a and the second power generation unit 102b are stacked together alternately to form the coolant flow field 44 including a plurality of grooves 44e extending in the direction indicated by the arrow B between the first power generation unit 102a and the second power generation unit 102b.

In the second embodiment having the above structure, in the first power generation unit 102a, corrugations of the fuel gas flow field 108 and the oxygen-containing gas flow field 110 are in the same phase with each other in the stacking direction (see FIG. 9). Further, corrugations of the fuel gas flow field 108 and the oxygen-containing gas flow field 110 have the same pitch and amplitude. In the structure, the membrane electrode assembly 16 is sandwiched between ridges 108c forming the corrugated flow grooves 108a and ridges 110c forming the corrugated flow grooves 110a at the same positions in the stacking direction. Therefore, no shearing force is applied to the membrane electrode assembly 16, and damages of the membrane electrode assembly 16 can be prevented advantageously.

Likewise, in the second power generation unit 102b, the fuel gas flow field 108 and the oxygen-containing gas flow field 110 are in alignment with each other in the stacking direction. Therefore, since the membrane electrode assembly 16 is sandwiched between ridges 108d forming the corrugated flow grooves 108b and ridges 110d forming the corrugated flow grooves 110b at the same positions along the stacking direction, no shearing force is applied to the membrane electrode assembly 16, and damages of the membrane electrode assembly 16 can be prevented advantageously.

Further, the embodiment can be carried out simply by alternately stacking the first power generation unit 102a and the second power generation unit 102b, and the same advantages as in the case of the first embodiment are obtained.

The invention claimed is:

1. A fuel cell stack including power generation units stacked in a horizontal direction, each power generation unit formed by sandwiching an electrolyte electrode assembly between metal separators, the electrolyte electrode assembly including an anode, a cathode, and an electrolyte interposed between the anode and the cathode, the power generation units each having a corrugated fuel gas flow field including a plurality of corrugated flow grooves for supplying a fuel gas to the anode, the corrugated fuel gas flow field having a concave-convex shape in cross section, the plurality of corrugated flow grooves of the fuel gas flow field extending along a longitudinal direction of the separators, and a corrugated oxygen-containing gas flow field including a plurality of corrugated flow grooves for supplying an oxygen-containing gas to the cathode, the corrugated oxygen-containing gas flow field having a concave-convex shape in cross section, the plurality of corrugated flow grooves of the oxygen-containing gas flow field extending along the longitudinal direction of the separators, the power generation units including a first power generation unit and a second power generation unit stacked alternately such that a coolant flow field is formed between the first power generation unit and the second power generation unit, wherein the plurality of corrugated flow grooves of the fuel gas flow field and the plurality of corrugated flow grooves of the oxygen-containing gas flow field of the first power generation unit are in the same phase with each other;

the plurality of corrugated flow grooves of the fuel gas flow field and the plurality of corrugated flow grooves of the oxygen-containing gas flow field of the second power generation unit are in the same phase with each other; and the plurality of corrugated flow grooves of the fuel gas flow field and the plurality of corrugated flow grooves of the oxygen-containing gas flow field of the first power generation unit and the plurality of corrugated flow grooves of the fuel gas flow field and the plurality of corrugated flow grooves of the oxygen-containing gas flow field of the second power generation unit are in different phases from each other, respectively.

2. A fuel cell stack according to claim 1, wherein the first power generation unit includes first and second electrolyte electrode assemblies and the second power generation unit includes third and fourth electrolyte electrode assemblies;

the first electrolyte electrode assembly is stacked on a first metal separator, a second metal separator is stacked on the first electrolyte electrode assembly, the second electrolyte electrode assembly is stacked on the second metal separator, and a third metal separator is stacked on the second electrolyte electrode assembly.

3. A fuel cell stack according to claim 1, wherein the first and second power generation units are formed by stacking the electrolyte electrode assemblies and the metal separators alternately such that the metal separators are provided at both ends of the fuel cell stack in the stacking direction.

4. A fuel cell stack including power generation units stacked in a horizontal direction, each power generation unit formed by sandwiching an electrolyte electrode assembly between metal separators, the electrolyte electrode assembly including an anode, a cathode, and an electrolyte interposed between the anode and the cathode, the power generation units each having a corrugated fuel gas flow field including a plurality of corrugated flow grooves for supplying a fuel gas to the anode, the plurality of corrugated flow grooves of the fuel gas flow field extending along a longitudinal direction of the separators, and a corrugated oxygen-containing gas flow field including a plurality of corrugated flow grooves for supplying an oxygen-containing gas to the cathode, the plurality of corrugated flow grooves of the oxygen-containing gas flow field extending along the longitudinal direction of the separators, the power generation units including a first power generation unit and a second power generation unit stacked alternately such that a coolant flow field is formed between the first power generation unit and the second power generation unit, wherein the plurality of corrugated flow grooves of the fuel gas flow field and the plurality of corrugated flow grooves of the oxygen-containing gas flow field of the first power generation unit are in the same phase with each other;

the plurality of corrugated flow grooves of the fuel gas flow field and the plurality of corrugated flow grooves of the oxygen-containing gas flow field of the second power generation unit are in the same phase with each other; and the plurality of corrugated flow grooves of the fuel gas flow field and the plurality of corrugated flow grooves of the oxygen-containing gas flow field of the first power generation unit and the plurality of corrugated flow grooves of the fuel gas flow field and the plurality of corrugated flow grooves of the oxygen-containing gas flow field of the second power generation unit are in different phases from each other, respectively, wherein the separators of the first power generation unit has the same shape as the separators of the second power generation unit.

\* \* \* \* \*